Jan. 21, 1930. R. F. SEDGLEY Re. 17,571

FIREARM

Original Filed Dec. 31, 1927

INVENTOR
Reginald F. Sedgley
BY
Herbert S. Fairbanks
ATTORNEY

Reissued Jan. 21, 1930 Re. 17,571

UNITED STATES PATENT OFFICE

REGINALD F. SEDGLEY, OF PHILADELPHIA, PENNSYLVANIA, ASSIGNOR TO REGINALD F. SEDGLEY, INC., OF PHILADELPHIA, PENNSYLVANIA, A CORPORATION OF PENNSYLVANIA

FIREARM

Original No. 1,664,049, dated March 27, 1928, Serial No. 243,831, filed December 31, 1927. Application for reissue filed November 21, 1928. Serial No. 320,971.

The object of this invention is to devise a novel construction and arrangement of a gun which has the appearance of a fountain pen but which can be employed to fire a cartridge.

With the above and other objects in view as will hereinafter clearly appear my invention comprehends a novel gun which has the appearance of a fountain pen.

It further comprehends a novel construction of a gun having a single slot in one side of its barrel through which a plunger resetting member extends and provided with a thumb receiving depression in proximity to an opening in the barrel through which a manually actuated releasing member extends when the spring pressed plunger is in its reset position.

Other novel features of construction and advantage will hereinafter more clearly appear in the detailed description and the appended claims.

For the purpose of illustrating the invention, I have shown in the accompanying drawings a typical embodiment of it, which, in practice, will give reliable and satisfactory results. It is, however, to be understood that this embodiment is typical only and that the various instrumentalities of which my invention consist can be variously arranged and organized, and that the invention is not limited to the precise arrangement and organization of these instrumentalities as herein set forth.

Similar numerals of reference indicate corresponding parts.

Referring to the drawings:—

Figure 1:
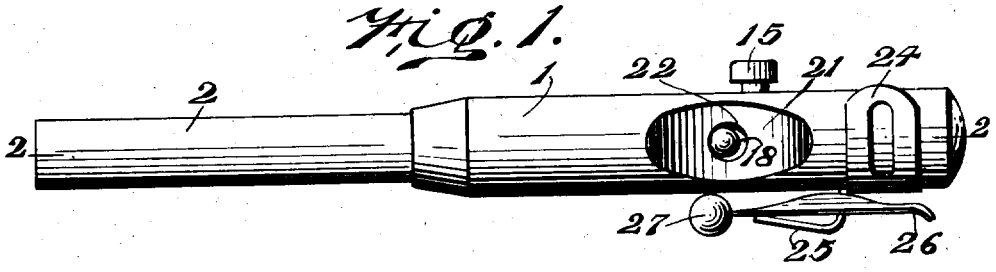
Figure 1 is a top plan view of a fire arm embodying my invention.

The fire arm is constructed in such a manner that its barrel and casing simulate a fountain pen.

1 designates the casing to which is detachably connected the barrel 2, and, as illustrated, they are in threaded engagement with each other, the casing being internally threaded at its forward end as at 3 while the rear end of the barrel 2 is externally threaded as at 4.

5 designates the breech block which is provided with a thread in order that it can be screwed into the casing 1 to abut against the shoulder 6. The breech block 5 is provided with a slot at one end adapted to receive a screw driver or other implement for inserting it in position.

The breech block 5 is also provided with an aperture 8 through it which is adapted to receive a firing pin 9 extending through it, the latter having a laterally extending pin 10 which travels in a recess 11 in order to retain the firing pin in assembled condition with respect to the breech block 5.

The casing 1 is provided with a chamber 12 in which a plunger 13 is slidable, said plunger being internally recessed at its rear end to receive a spring 14, one end of which abuts against the rear wall of the chamber 12 so that the tendency of this spring 14 is to move the plunger 13 forwardly. The plunger 13 has connected with it a resetting member 15 having a grasping portion and this resetting member 15 is slidable in a longitudinally extending slot 16 in the casing 1. The plunger 13 is provided with a lateral extending recess 17 to slidably receive a releasing member 18 which is normally moved outwardly by means of a spring 19. When the barrel 2 is in position it secures in firing position a cartridge 20 which is held in position against the breech block 5 by the barrel 2.

The casing 1 is provided with a thumb receiving depression 21 having an opening 22 through it in order to permit the releasing member 18 to pass therethrough and extend exterior of the depression 21.

In order that the fire arm will have the same general appearance as a fountain pen it is provided with a clip in order that it can be carried in the pocket in the same manner that a fountain pen is carried. The casing 1 at its outer periphery at its rear end is provided with recesses 23 adapted to receive the clip 24 which is provided with a spring member 25 which is adapted to press against a clamping member 26 carried by said clip and provided with a ball 27.

Figure 2:
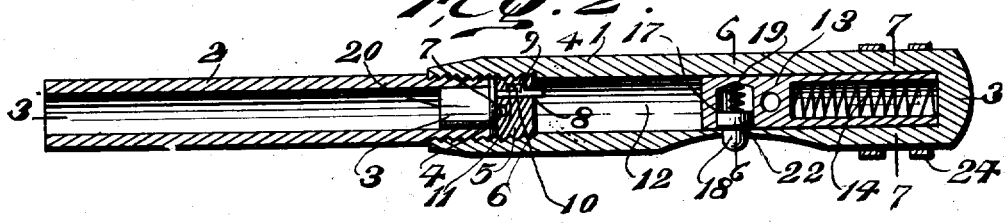
Figure 2 is a section on line 2—2 of Figure 1.
Figure 3:
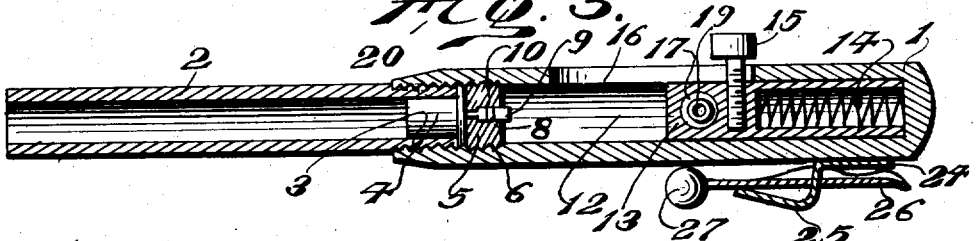
Figure 3 is a section on line 3—3 of Figure 2.
Figure 4:
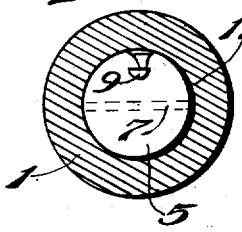
Figure 4 is a section on line 4—4 of Figure 2.
Figure 5:
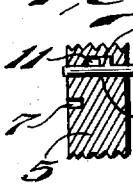
Figure 5 is a sectional view of the breech block and firing pin on an enlarged scale.
Figure 6:
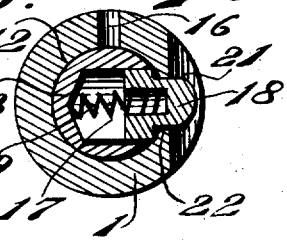
Figure 6 is a section on line 6—6 of Figure 2.
Figure 7:
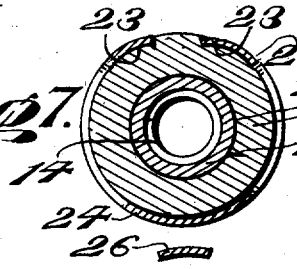
Figure 7 is a section on line 7—7 of Figure 2.

In the operation, a cartridge 20 is placed in the bore of the barrel 2 and the barrel is then screwed in the casing 1 in the position seen in Figures 2 and 3. As illustrated, the firing pin 9 is arranged for a rim fire but it will be apparent that it can also be arranged for a center fire if desired. When it is desired to fire the fire arm, the resetting member 15 is moved rearwardly until the spring 19 causes the releasing member 18 to pass through the aperture 22 so that the spring 14 of the plunger 13 is under tension and the plunger is retained in its rearward position. The user grasps the casing 1 of the fire arm in one hand and presses downward with his thumb upon the releasing member 18 thereby moving the latter inwardly so that the spring 14 can move the plunger 13 forwardly into contact with the firing pin 9 and thus effect the firing of the cartridge 20.

My present invention can be economically manufactured and with a minimum number of parts it forms an effective fire arm which can be used at a short range. The forward end of the casing 1 is preferably tapered forwardly towards the barrel 2.

It will now be apparent that I have devised a new and useful fire arm which embodies the features of advantage enumerated as desirable in the statement of the invention and the above description, and while I have, in the present instance, shown and described a preferred embodiment thereof which will give in practice satisfactory and reliable results, it is to be understood, however, that this embodiment is susceptible of modification in various particulars without departing from the spirit or scope of the invention or sacrificing any of its advantages.

Having thus described my invention what I claim as new and desire to secure by Letters Patent, is:—

1. A firearm simulating a fountain pen, comprising a casing, a barrel detachably connected with said casing and provided with a thumb receiving depression, a breech block in said barrel, a firing pin for the breech block, a spring pressed plunger in said barrel, said barrel having an opening through said depression, and a spring pressed releasing member carried by said plunger and adapted to extend through said opening when said plunger is in its retracted position.

2. A firearm simulating a fountain pen, comprising a casing, a barrel detachably connected with said casing and adapted when connected to said casing to retain a cartridge in firing position, said barrel having a thumb receiving depression with an opening therethrough into its bore, a breech block in said barrel, a firing pin for the breech block, a spring pressed plunger in said barrel, a resetting member extending through said slot and connected with said plunger, and a spring pressed releasing member carried by said plunger and adapted to extend through the opening in said depression when the plunger is in its retracted position.

3. A firearm simulating a fountain pen, comprising a casing having clip receiving depressions, a clip cooperating with said depressions, a barrel connected with said casing and provided with a depression and having an opening through said depression, a breech block at the forward end of said barrel, a firing pin for said breech block, a spring pressed plunger in said barrel in rear of said breech block, and a spring pressed release member carried by said plunger and adapted to extend through said opening when said plunger is in its retracted position.

4. A firearm simulating a fountain pen, comprising a casing, a barrel detachably connected with said casing, a breech block in said barrel, a firing pin for said breech block, a spring pressed plunger in said barrel, said barrel having an opening through its side wall, and a spring pressed releasing member carried by and movable into said plunger and adapted to extend through said opening when said plunger is in its retracted position, said releasing member during the forward movement of the plunger being contained within the plunger and concealed by the casing.

REGINALD F. SEDGLEY.